No. 796,172. PATENTED AUG. 1, 1905.
H. S. ANDERSON & J. W. BENNIE.
ORE DRESSING MACHINE.
APPLICATION FILED MAY 19, 1903.
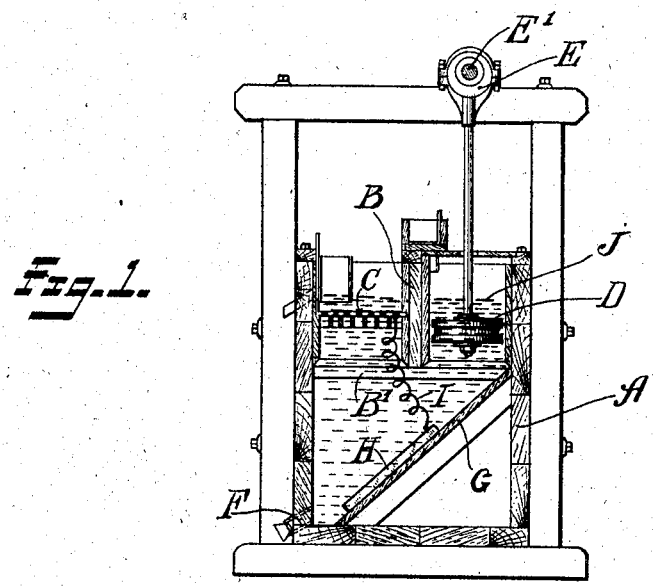
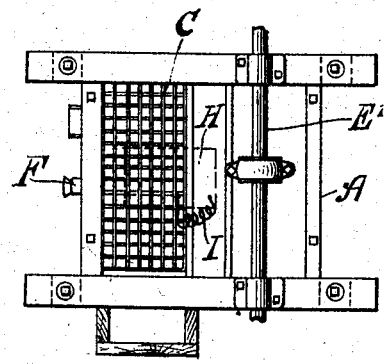
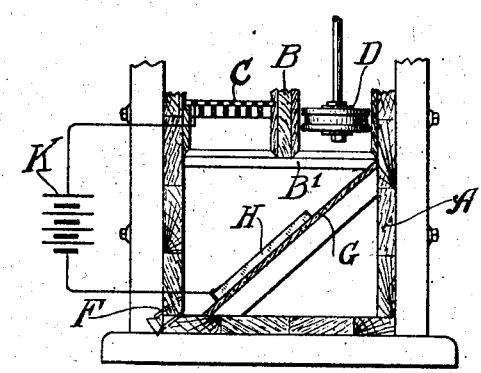
WITNESSES:
INVENTORS
Henry S. Anderson
John W. Bennie
BY
ATTORNEY

UNITED STATES PATENT OFFICE.

HENRY S. ANDERSON AND JOHN W. BENNIE, OF CLIFTON, ARIZONA TERRITORY.

ORE-DRESSING MACHINE.

No. 796,172.           Specification of Letters Patent.           Patented Aug. 1, 1905.

Application filed May 19, 1903. Serial No. 157,842.

*To all whom it may concern:*

Be it known that we, HENRY S. ANDERSON and JOHN W. BENNIE, citizens of the United States, residing at Clifton, in the county of Graham, Territory of Arizona, have invented certain new and useful Improvements in Ore-Dressing Machines, of which the following is a full, clear, and exact description.

Our invention relates to improvements in concentrating-jigs and similar apparatus, and has for its object to provide an ore-dressing machine in which expensive metallic screens are rendered more lasting without in any way interfering with the fundamental principles of construction or operation of the apparatus.

The principle on which all forms of jigs work is the tendency of a mixture of ore particles of approximate size but varying specific gravity to arrange itself in layers according to their specific gravities when given a motion of adjustment by means of a pulsating column of water or other concentrating liquid.

The type of concentrating-jig most generally used consists of a water-tank divided by a partition in the upper part thereof, which does not extend to the bottom. On one side of the partition is fixed a horizontal metallic screen on which the sized ore is fed. On the other side of the partition is a loosely-working plunger or piston, operated vertically by an eccentric, crank, or other reciprocating device. The action of the plunger is to cause a regular pulsation of the water through the metallic screen, so affecting the particles of ore resting thereon that the heavier particles settle down through the lighter and either discharge through the screen itself or by a suitable gate above the screen-level, while the lighter particles of rock move on horizontally, discharging over the side or end of the screen-frame. The metallic screens mentioned above are subject to great wear, partly due to the metallic abrasion of the ore and partly to the corrosive action of acids, alkalies, or metallic salts present in the water used as a concentrating medium, and it is the object of our invention to prevent such corrosion. We accomplish this by making the screen an electronegative element of a galvanic cell or electrolytic bath, substantially as shown in the drawings made a part of this application.

In the drawings, Figure 1 is a vertical section of a concentrating-jig embodying our invention. Fig. 2 is a plan view of the same. Fig. 3 is a vertical section of a modification thereof.

Referring more particularly to the drawings, A is the tank containing the water or other concentrating liquid. B is a partition in the upper part thereof, extending toward the bottom and braced by a cross-bar B'.

C is the metallic ore-bed screen, upon which the ore to be concentrated is deposited.

D is the plunger or piston, working on the other side of the partition B with a reciprocating motion derived from the eccentric E upon the shaft E'.

F is a discharge-pipe normally closed for drawing off the concentrating liquid.

G is a slanting bottom in the tank.

H is an electrode located below the screen C and electrically connected therewith by the conductor I. This electrode H is of some metal which when immersed in the concentrating liquid is electropositive relatively to the screen C. Thus if the screen C is made of copper and the concentrating liquid contains sulfuric acid or sulfate of copper, as is usual when treating ores containing sulfid of copper, such acid and metallic salt being derived from the ore by the action of the water in the concentrating medium, the electrode G would be made of zinc or similar metal. The concentrating-bath J rises above the screen C, so as to submerge both it and the electrode H.

The screen C being electronegative relatively to the electrode H, the two constituting an electrolytic couple, it results that the screen C is protected against corrosion and that whatever corrosion takes place will be upon the electrode H. Oxygen and sulfuric acid will be set free at the positive pole H and hydrogen at the copper screen C, eliminating any possibility of corrosive action upon the screen with a tendency to destroy it, and, moreover, causing copper to be deposited on the screen from the solution, thus building up the screen in opposition to the abrasive action of the ore. By thus sacrificing an inexpensive material in an inexpensive form we are able to protect the more expensive screens against corrosion and abrasion.

We have found that our invention makes it possible to use steel-wire or punched-steel screens many times less expensive than brass or copper by using zinc as the sacrificed electropositive element in connection therewith, as described.

In the modification shown in Fig. 3 we make the electrode H of some material such as graphite or other durable conducting material and connect the screen C and the electrode H with an external source of continuous current K in such a way as to render the screen electronegative and the electrode H the electropositive element. With this arrangement the same effect is produced upon the screen C, hydrogen being set free at its surface and copper being deposited thereon and protection against corrosion and abrasion afforded.

By locating the electropositive electrode below the screen it is subject to the main current of the moving fluid, which thus tends to keep its surface free from impurities, while its location slightly to one side of the screen and under the partition B between the screen and plunger prevents solid matter as it falls from the screen settling on the upper portion of the electrode.

The apparatus shown in Fig. 3 and described in the specification is described and claimed in a division of this application, Serial No. 243,830, filed February 2, 1905.

What we claim is—

1. In an ore-dressing machine, the combination of a containing vessel, a metallic ore-bed screen therein forming an electrode, an electrolytic liquid containing metallic salt derived from the ore treated and submerging said screen, means for causing said liquid to pass and repass through said screen, a second electrode in said vessel submerged in said liquid, and means for maintaining the screen in an electronegative condition relatively to said second electrode.

2. In an ore-dressing machine, the combination of a containing vessel, a metallic screen therein forming an electrode, an electrolytic liquid containing sulfate of copper derived from the ore treated and submerging said screen, means for causing said liquid to pass and repass through said screen, a second electrode in said vessel submerged in said liquid, and means for maintaining said screen in an electronegative condition relatively to said second electrode.

3. In a concentrating-jig, a metallic ore-bed screen, an electrode, which is electropositive relatively to said screen, and means for electrically connecting said screen and said electrode, the screen and electrode being submerged in an electrolytic liquid containing sulfate of copper derived from the ore treated.

4. In a concentrating-jig, the combination of a metallic ore-bed screen, an electrode which is electropositive relatively thereto, and means for electrically connecting said screen and said electrode, and a concentrating liquid containing a metallic salt derived from the ore treated submerging both said screen and said electrode.

5. In a concentrating-jig, the combination of a metallic ore-bed screen, an electrode, a concentrating medium containing a metallic salt of the ore treated and rendering said electrode electropositive relatively to said screen, and a short circuit between said screen and said electrode.

6. In an ore-dressing machine, the combination of a containing vessel, a metallic screen therein forming an electrode, an electrolytic liquid containing a metallic salt derived from the ore treated and submerging said screen, means for causing said liquid to pass and repass through said screen, a second electrode in said vessel submerged in said liquid and subject to the current thereof, and means for maintaining said screen in an electronegative condition relatively to said second electrode.

HENRY S. ANDERSON.
JOHN W. BENNIE.

Witnesses:
J. B. SMITH,
J. A. MERRILL.